United States Patent [19]

Krauer et al.

[11] Patent Number: 4,966,047
[45] Date of Patent: Oct. 30, 1990

[54] HANDLEBAR-MOUNTED CABLE CONTROL

[75] Inventors: Alwin Krauer, 111 E. Chestnut, Apt. 18H, Chicago, Ill. 60611; Richard P. Frueh, Chicago, Ill.

[73] Assignee: Alwin Krauer, Chicago, Ill.

[21] Appl. No.: 327,758

[22] Filed: Mar. 23, 1989

Related U.S. Application Data

[62] Division of Ser. No. 130,096, Dec. 7, 1987, abandoned.

[51] Int. Cl.⁵ .......................... G05G 11/00; F16C 1/10
[52] U.S. Cl. ........................................ 74/502.2; 74/483
[58] Field of Search ............. 74/488, 489, 99 A, 99 R, 74/502.2, 551.9, 558, 558.5

[56] References Cited

U.S. PATENT DOCUMENTS

| | | |
|---|---|---|
| 359,536 | 3/1887 | Hazen et al. |
| 425,789 | 4/1890 | Hems |
| 428,383 | 5/1890 | Elliott |
| 575,936 | 1/1897 | Roso |
| 591,994 | 10/1897 | Warren et al. |
| 603,706 | 5/1898 | Rausch |
| 637,085 | 11/1899 | Chase |
| 637,821 | 11/1899 | Paulson |
| 1,231,055 | 6/1917 | Packard |
| 1,449,349 | 3/1923 | Pullin |
| 2,271,273 | 1/1942 | Mueller |
| 2,387,020 | 11/1945 | Helme |
| 2,788,676 | 4/1957 | Spexarth |
| 2,830,463 | 4/1958 | Irgens .............................. 74/489 X |
| 2,874,587 | 2/1959 | Schmid |
| 4,225,124 | 9/1980 | Pollack ............................ 74/99 A |
| 4,653,613 | 3/1987 | Blancas |

FOREIGN PATENT DOCUMENTS

| | | |
|---|---|---|
| 516475 | 1/1953 | Belgium . |
| 968972 | 12/1950 | France . |
| 1109346 | 1/1956 | France . |
| 284485 | 4/1931 | Italy . |
| 294968 | 4/1932 | Italy . |
| 312039 | 10/1933 | Italy . |
| 399020 | 10/1942 | Italy . |
| 425312 | 10/1947 | Italy . |
| 455397 | 2/1950 | Italy ..................... 74/489 |
| 460899 | 12/1950 | Italy ..................... 74/502.2 |
| 237541 | 8/1945 | Switzerland . |
| 348062 | 9/1960 | Switzerland ............ 74/489 |
| 013520 | 6/1902 | United Kingdom . |
| 349765 | 6/1931 | United Kingdom . |
| 354111 | 8/1931 | United Kingdom ......... 74/489 |
| 431197 | 6/1935 | United Kingdom ......... 74/489 |
| 901937 | 7/1962 | United Kingdom . |

Primary Examiner—Vinh T. Luong
Attorney, Agent, or Firm—Welsh & Katz, Ltd.

[57] ABSTRACT

A handlebar-mounted cable control for a bicycle brake or the like, including a cable fitting fixed within the handlebar and having a throughbore and an angled surface facing an open end of the handlebar, a tubular handle member being inserted over and coaxially rotatable about the end of the handlebar, the handle member having an insert with a throughbore and an angled surface being generally complementary with the angled surface of the cable fitting. The brake cable is inserted in the throughbore and a cable end is fixed to the insert so that as the handle member is rotated, the brake cable is pulled, activating the brake.

9 Claims, 3 Drawing Sheets

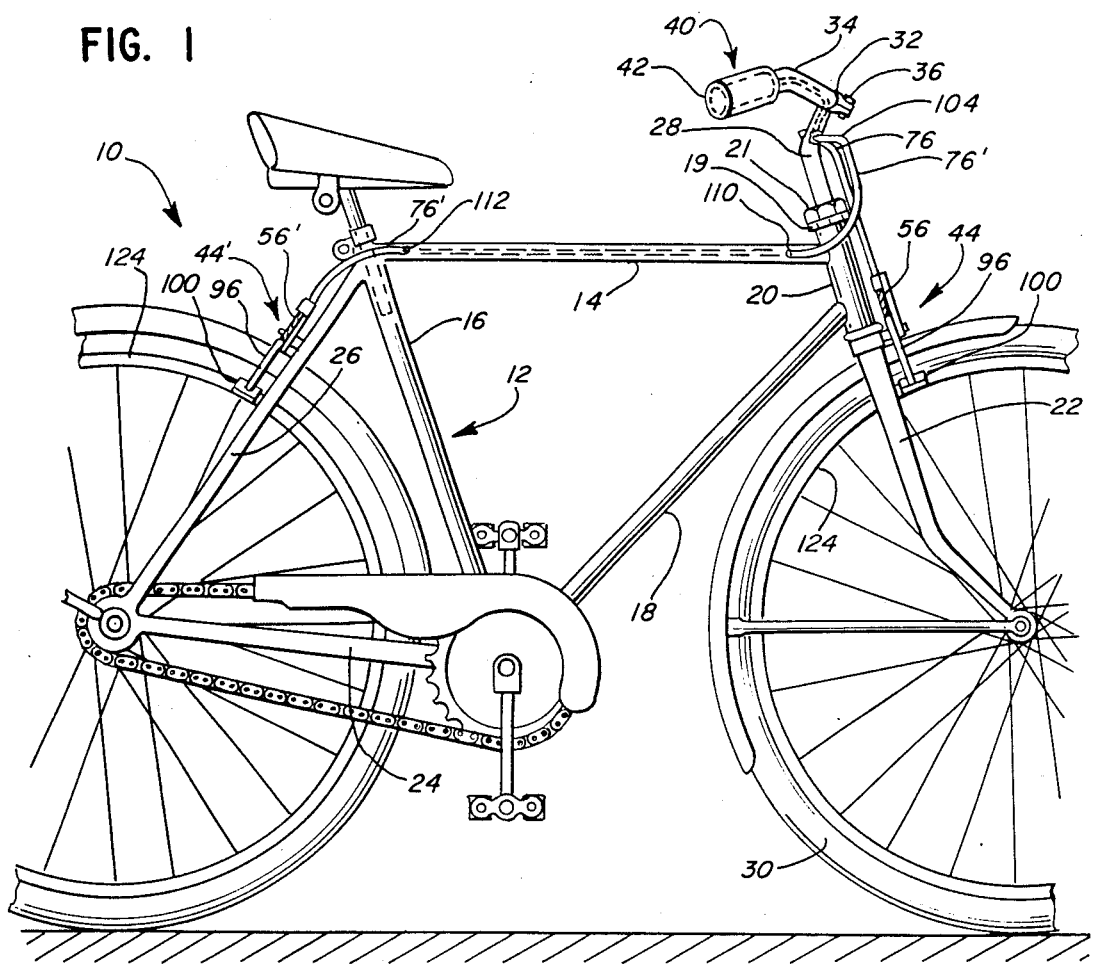
FIG. 1
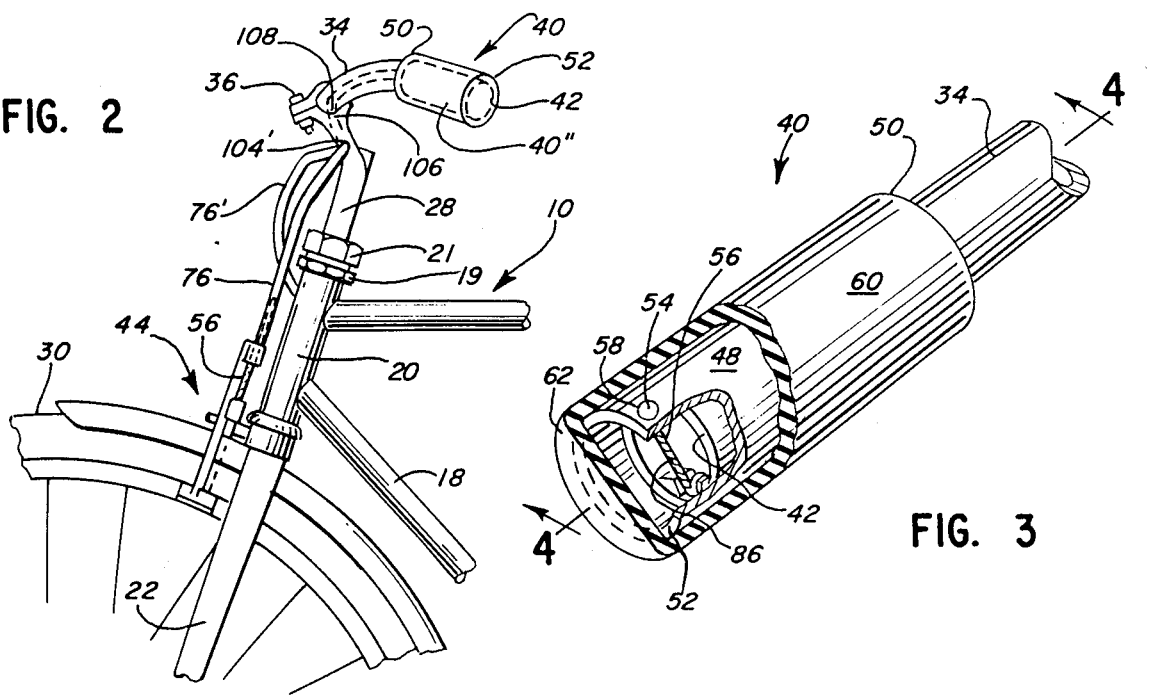
FIG. 2
FIG. 3

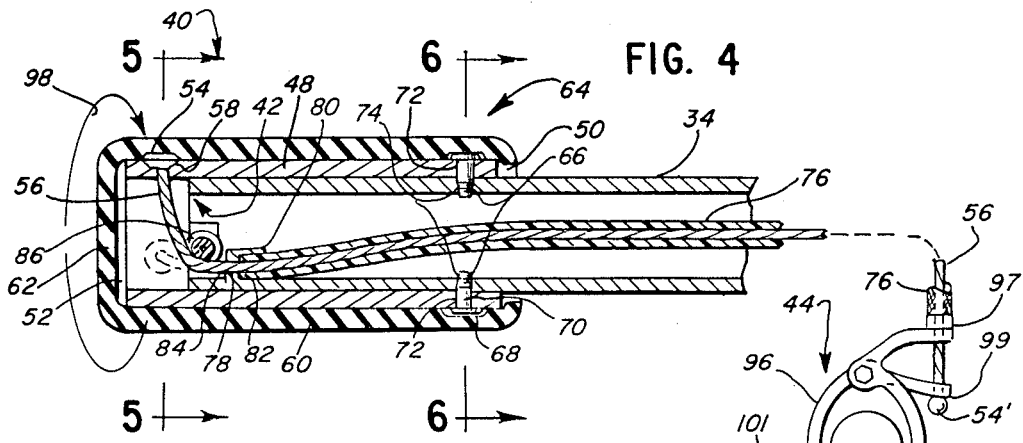
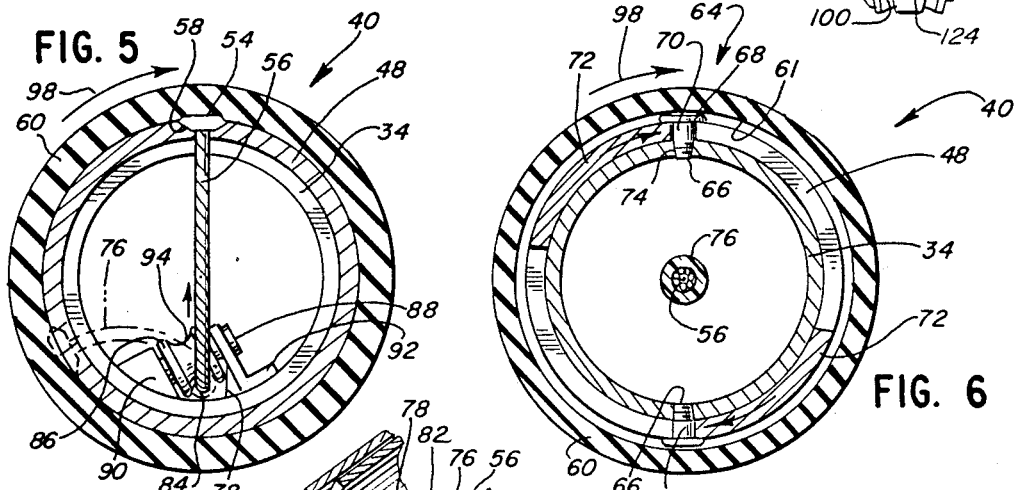
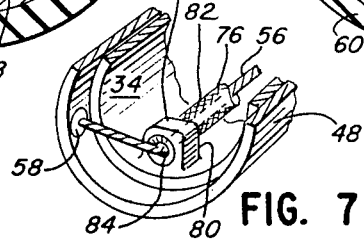
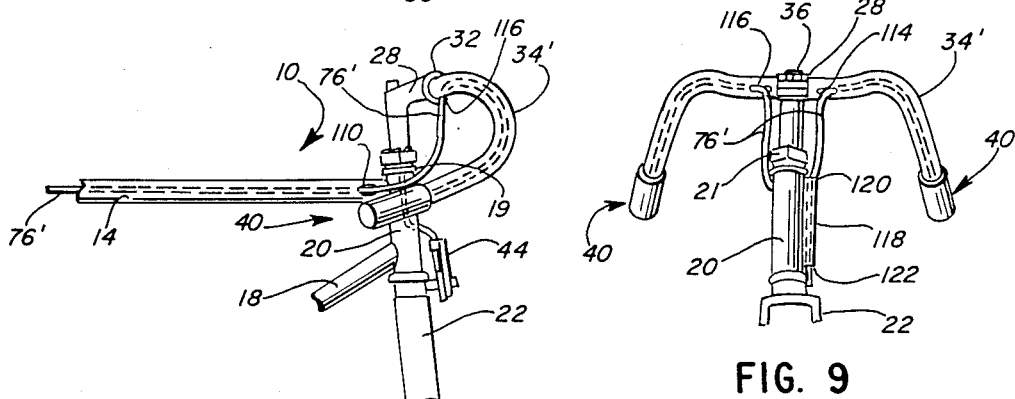

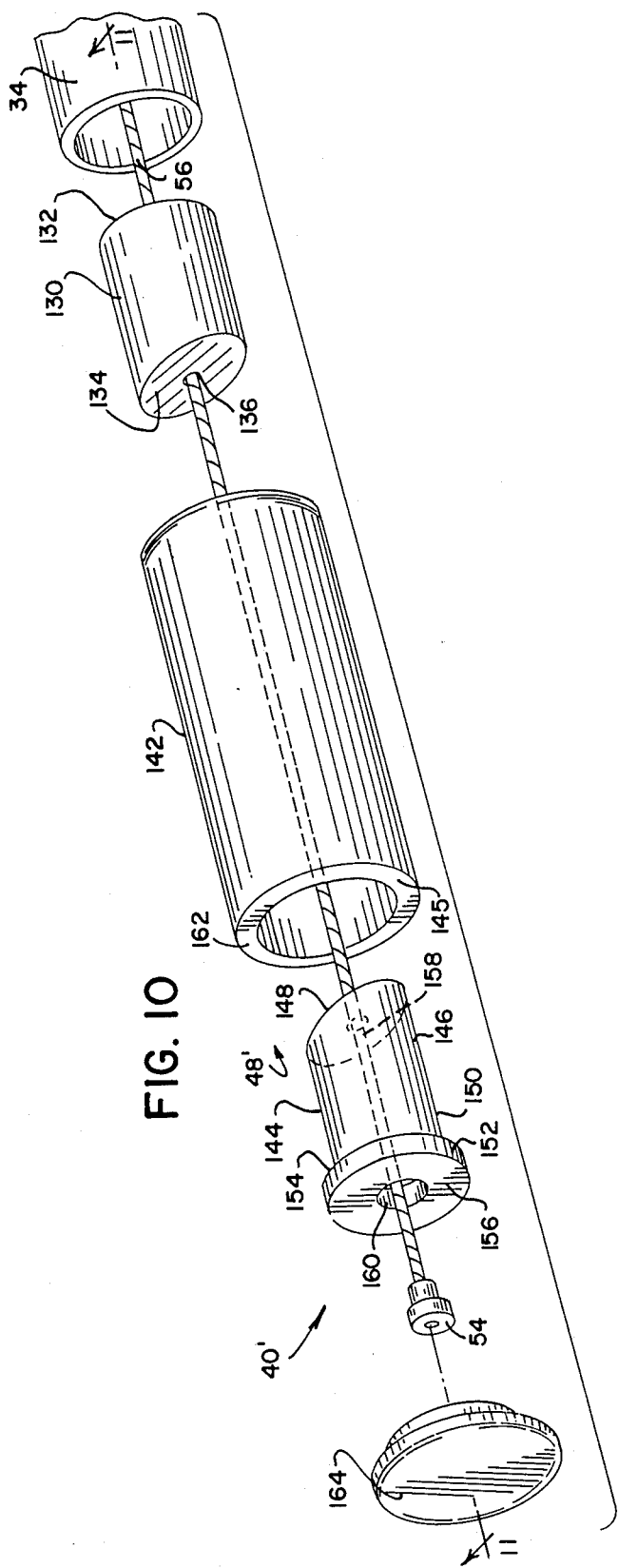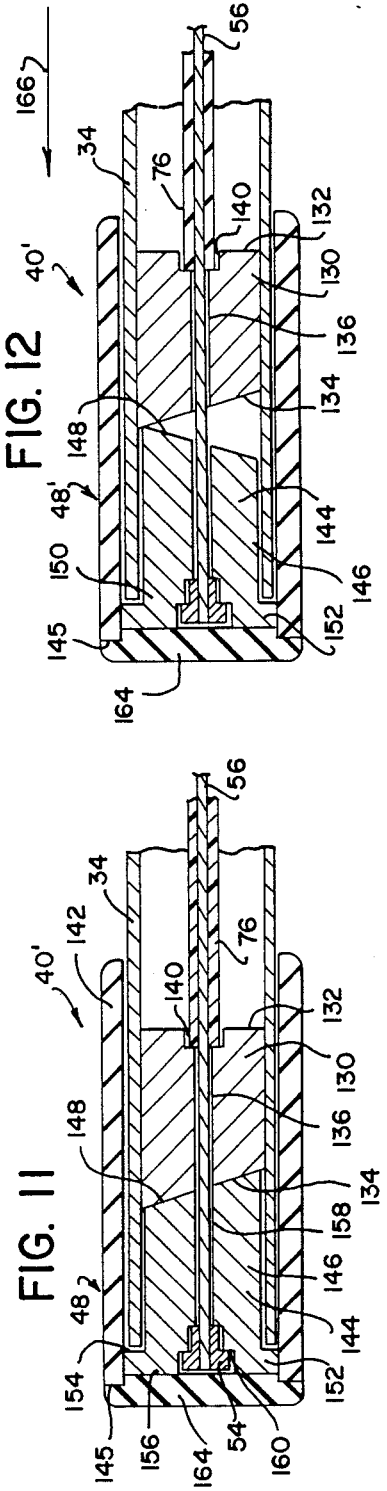

HANDLEBAR-MOUNTED CABLE CONTROL

RELATED APPLICATION

This application is a continuation-in-part of Ser. No. 07/130,096, filed Dec. 7, 1987, entitled "Bicycle Brake Control and Cabling Construction" now abandoned.

BACKGROUND OF THE INVENTION

1. Field of the Invention

This invention relates generally to handlebar-mounted cable controls for caliper-type bicycle brakes or other cable operated devices, and more particularly, to such a cable control mounted at the end of a handlebar for coaxial rotation thereabout.

2. Description of the Related Art

Handlebar-mounted bicycle caliper brake cable controls generally are provided in two basic configurations. The first employs a lever-type hand control whereby the rider, whose hands are positioned on the handlebar, must extend his fingers to grasp the lever and pull it towards the handlebar. The rider moves the lever, connected by a sheathed brake cable to the caliper brake, to overcome a spring-loaded biasing force which normally maintains the calipers in an open position, to clamp the brake shoes against the wheel rim to stop the bicycle.

This prior art configuration has several drawbacks, including the fact that in emergency situations, the rider must quickly move his hands to the correct position on the handlebar to activate the brake lever in time to stop the bicycle. If the rider's reaction is delayed, the brake levers may not be properly gripped, and the bicycle may not be stopped when desired.

A further drawback of the lever type brake control is that a certain amount of finger strength is required to exert sufficient force on the lever to obtain positive braking. Riders with relatively weak hands and fingers, such as children and the elderly, may have difficulty exerting sufficient force on lever type brake controls to obtain positive braking. Also, these two groups of riders often have inherently slower emergency reaction times, thus increasing the potential for accidents due to a failure to maintain proper brake control.

The second prior art type of handlebar-mounted brake cable control employs a hollow hand grip member axially rotatable about ends of the handlebar. To activate the brakes, the rider twists the hand grip member, which is connected to the brake by a cable in a fashion similar to the lever type control described previously. The hand grip type of control obviates some of the drawbacks of the lever type control in that the omission of the lever removes the necessity to place the hands in as specific a location on the handlebar prior to braking. This decreases the emergency reaction time. In addition, the rider does not have to loosen his grip on the handlebar to activate the brakes. The rider merely rotates the grip by twisting his wrists, the muscles of which normally are stronger than the finger muscles. Thus, the hand grip type of brake control permits faster reaction time and requires less effort to operate.

Conventional rotatable hand grip brake cable controls have not been widely accepted. This is due in part to the relatively complex linkages and brackets normally found on such devices, which are also relatively expensive to manufacture, assemble and maintain compared to the lever type controls. Furthermore, in conventional rotatable hand grip controls, portions of the cable linkage related thereto are often mounted on the exterior of the handlebar, where they are exposed to damage, and may cause injury to the rider, especially in emergency situations when the rider must move his hands quickly along the handlebar to the hand grip controls.

Furthermore, in both types of conventional brake controls, the end of the cable connected to the controls often is exposed to weather elements, and is thus susceptible to corrosion. Corroded brake cable ends often become rusted within the sheathing, making the brakes difficult to operate, if not inoperable.

Thus, there is a need for a bicycle brake control which is easily accessible in emergencies, requires relatively little force to activate, is simple and inexpensive to manufacture and assemble and has a minimum of exposed components.

SUMMARY OF THE INVENTION

The disadvantages of the prior art controls are overcome in accordance with the present invention by providing a brake cable control which includes a twist grip brake control handle mounted to an end of a bicycle handlebar which enables rapid activation of the brakes with minimum effort. The brake cable control of the invention also features a brake cable which is partially concealed within the handlebar for corrosion protection as well as providing the bicycle with an uncluttered aesthetic appearance.

More specifically, a brake cable control associated with the handlebar of a bicycle is provided with a hollow handle member coaxial with and rotatable upon an end of the handlebar and a fitting to secure the end of a brake cable therein, apparatus for maintaining the position of the handle member relative to the end of the handlebar, a sheathed brake cable with an end portion thereof located within the handlebar, and a cable support member fixed to the inside of said handlebar for engaging the end of the cable sheath yet permitting the cable to pass therethrough to engage the handle member. As the handle member is rotated, the brake cable is pulled, activating the brake.

In a preferred embodiment, an insert portion of a rotatable hand grip and a fitting supporting the cable in the handlebar member are provided with complementary angled surfaces which, when rotated relative to each other, pull the cable a specified distance to activate the brakes without exerting undue bending stress on the cable.

It is also preferred that separate brake controls are provided for the front and rear brakes, one control located at each end of the handlebar. In addition, both the front and rear brake cables may be partially concealed within the handlebar, and may also be concealed within the portions of the frame.

BRIEF DESCRIPTION OF THE DRAWINGS

FIG. 1 is a side elevational view of a bicycle in which the brake cable control of the invention is incorporated, with the rear brake cable shown in partial phantom outline the handlebar and main frame tube;

FIG. 2 is a fragmentary slightly enlarged opposite side elevational view of the bicycle illustrated in FIG. 1 in which the brake cables are shown inserted into the handlebar separate apertures in the stem;

FIG. 3 is a fragmentary perspective view in partial section, of a bicycle handle depicting the brake control of the invention;

FIG. 4 is a sectional view taken along line 4—4 of FIG. 3 in the direction indicated generally;

FIG. 5 is a sectional view taken along line 5—5 of FIG. 4 in the indicated generally;

FIG. 6 is a sectional view taken along line 6—6 of FIG. 4 in the indicated generally;

FIG. 7 is a fragmentary perspective view of an alternate embodiment of the cable mounting arrangement depicted in FIG. 5;

FIG. 8 is a fragmentary side elevational view of a bicycle illustrating an alternate embodiment of the invention, in which the brake cables are shown passing directly into the handlebar;

FIG. 9 is a fragmentary front elevational view of the bicycle shown in FIG. 8;

FIG. 10 is an exploded front perspective elevational view of cable mounting arrangement;

FIG. 11 is a fragmentary vertical sectional view taken along the line 11—11 of FIG. 10 and in the direction generally indicated of the cable control arrangement of FIG. 10 shown in the retracted or brake release position; and FIG. 12 is a fragmentary vertical sectional view of the cable control arrangement of FIG. 11 shown in the extended or brake actuating position.

DESCRIPTION OF THE PREFERRED EMBODIMENTS

Referring to FIG. 1, a bicycle 10 is shown having a tubular frame 12, which includes a main tube 14, a seat tube 16, a down tube 18, a head tube 20, a fork 22, a pair of chain stays 24 and a pair of seat stays 26. These tubular components of the frame 12 are fabricated of lightweight rigid materials such as alloy steel, aluminum and/or polymeric materials and are assembled by welding, brazing or other conventional techniques.

The bicycle is also provided with a substantially hollow gooseneck or stem 28 which is inserted into an open upper end 19 of the head tube 20 and secured to the fork 22 by a wedge (not shown) or other conventional device so that the stem 28 swivels with the fork 22. A locknut and headset bearing assembly 21 rotatably secures the fork 22 to the head tube 20. The stem 28 is provided with a handlebar clamp 32 through which is inserted the tubular handlebar 34. A handlebar clamp bolt 36 secures the handlebar 34 to the stem 28. Once the handlebar 34 is inserted in the stem 28, this stem-fork assembly is used to steer a front wheel 30. Although FIG. 1 depicts the so-called "English" style of handlebar, and FIGS. 8 and 9 depict the so-called racing or drop style of handlebar, the brake control of the invention may be adapted for use with any conventionally available handlebar configuration.

Referring now to FIG. 1, the brake control of the invention, designated generally by reference numeral 40, is designed to be mounted at one end 42 of the handlebar 34. Preferably, there is a brake control 40 at each end 42 of the handlebar 34, one control each for a front caliper brake 44 and one for a rear caliper brake 44'. However, it is contemplated that in some cases, the bicycle 10 may be provided with only a single caliper brake. In the latter case, only one handlebar end 42 will be provided with a control 40. Each brake control 40 is connected to the respective brake 44, 44' by a respective brake cable 56, 56', and each cable is provided with a protective sheath, 76, 76'.

The rear brake cable 56' and the sheath 76' are depicted partially enclosed within the handlebar 34, exiting the handlebar through an aperture 104 in the stem, and then being partially enclosed within the main tube 14, passing through a first aperture 110 and a second aperture 112. This mounting arrangement will be described in greater detail hereinafter.

Referring now to FIG. 2, an enlarged view of the front of the bicycle 10 depicted in FIG. 1 is presented, with the bicycle turned to expose the front brake cable 56 in greater detail. The front brake cable 56 and the sheath 76 are shown partially enclosed within the handlebar 34, and exit the handlebar 34 through the aperture 104 in the stem in similar fashion to the assembly for the rear brake cable 56' and the sheath 76'. The cable sheath 76' is also shown passing through apertures 106 and 108 which communicate with each other at the interface of the handlebar 34 and the stem 28. As was the case with the rear brake cable mounting arrangement, this arrangement will be described in greater detail hereinafter.

Referring now to FIGS. 3–6, the brake control 40 of the invention includes a hollow handle member 48 coaxial with and rotatable upon the end 42 of the handlebar 34. The handle member 48 is provided with a first open end 50 which slidingly engages the handlebar 34, and a second end 52 which is located in spaced relationship from the end 42 of the handlebar 34. The second end 52 is shown to be open in FIG. 3, but may also be closed, as shown in FIG. 4.

The handle member 48 is also provided with a fitting 58 to secure an enlarged end 54 of the brake cable 56 (the configuration of the front and rear brake cables are identical except as to length). In most cases, the fitting 58 is a countersunk aperture into which the cable 56 is threaded. In some cases, a resilient covering 60 may be provided for the handle member 48 to facilitate a positive grip thereon. The covering 60 may be fabricated of spongy rubber or plastic or equivalent materials, and may be fixed to the handle member 48 with adhesive. It is preferred that the resilient cover have a closed end 62 to prevent moisture from entering the interior of the handlebar 34, although an open end is also contemplated.

Referring now to FIGS. 4 and 6, an alignment apparatus 64 is shown for maintaining the position of the handle member 48 relative to the handlebar 34. In the preferred embodiment, the alignment apparatus 64 includes at least one threaded fastener 66 having a flat head 68 and an unthreaded shank portion 70. The fastener 66 is inserted through a slot 72 in the handle member 48 and is threaded into a bore 74 in the handlebar 34. At least one slot 72 is preferred, and two such slots are depicted in FIG. 6. The slots 72 are dimensioned to accommodate sufficient axial rotation of the handle member 48 upon the handlebar 34 to draw the brake cable 56 a sufficient distance to activate the brake 44. The covering 60 may be provided with an annular groove 61 to accommodate the rotation of the covering 60 over the fastener head 68. Although only one embodiment of alignment apparatus has been depicted, equivalent apparatus using conventional hardware are contemplated.

Referring now to FIGS. 4, 5 and 7, the brake cable 56 is shown provided with the flexible sheath 76. An open-ended barrel member 78 is fixed to the interior of the handlebar 34 near the end 42 thereof. The barrel member 78 is provided with an open end 80 which receives an end 82 of the cable sheath 76, thus securing the cable sheath to the interior of the handlebar 34. In addition, the barrel member 78 is also provided with a throughbore 84 exiting at the end opposite the open end 80, which is dimensioned to slidingly accept the brake cable 56. The brake cable 56 passes through the bore 84 to engage the aperture 58.

To avoid excessive wear on the cable 56 due to bending stress and friction with the barrel member 78, a pulley 86 (FIGS. 3, 4 and 5) may be provided journalled about a stud 88 fixed to the interior of the handlebar 34, such as by a base 90 and an 'L' bracket 92. The pulley 86 is positioned to receive the cable 56 in a groove 94 therein as the cable exits the barrel member 78. In some cases, the pulley 86 may be replaced by flaring the end of the cable throughbore 84 to prevent friction, as is shown in FIG. 7.

The brake cable 56 is located within the handlebar 34 to prevent corrosion, to improve operation and to provide a "cleaner" aesthetic appearance. Referring now to FIGS. 1 and 2, the cables 56, 56' may be inserted into the handlebar 34 through a first aperture 104 in the stem 28, and then through a second aperture 106 in the stem communicating with an aperture 108 in the handlebar 34 centrally located in the general area of the handlebar clamp 32. Suitable grommets (not shown) may be provided to line the apertures 104, 106, 108 to prevent damage to the cable sheath 76. The apertures 104, 106 and 108 may be dimensioned to accommodate the cables 56, 56' and the sheaths 76, 76' for both the front and rear brakes 44, 44'. However, in most cases separate apertures 104' located on opposite sides of the stem 28 will be provided for each cable (one such aperture shown in FIG. 2).

Referring now to FIG. 1, the rear brake cable 56' and the sheath 76' are shown concealed within the main tube 14. The cable 56' enters the interior of the tube 14 through a first aperture 110 located near the stem tube 20 and exits tube 14 through a second aperture 112 located near the seat tube 16. The cable 56' then engages the rear brake 44' in the manner depicted in FIG. 4. The apertures 110, 112 are shown on the same side of the main tube 14, that side corresponding to the control 40 corresponding to the rear brake 44', or the right hand grip as seen in FIG. 1. However, the cables may be assembled in crossed over fashion so that the left-hand control 40 actuated the rear brake 44'.

As an alternate embodiment, and referring to FIGS. 8 and 9, the brake cables 56 are shown exiting from the handlebar 34' through apertures 114 and 116 shown located on the handlebar 34' in close proximity to the stem 28. The rear brake cable 56' and the sheath 76' are shown partially concealed within the main tube 14, however, the front brake cable 56 and the sheath 76 may also be concealed in the area of the head tube 20. A sleeve 118 dimensioned to slidingly accept the cable 56 and the sheath 76 is secured by adhesive or suitable fasteners to the head tube 20. The sleeve 118 may be cylindrical or U-shaped. In the latter case, the open edge margins of the 'U' will be secured to the head tube 20. The front brake cable 56 and sheath 76 are inserted into an upper end 120 and exit through a lower end 122 of the sleeve 118.

In all embodiments, the concealed cables 56 and 56' and the sheaths 76 and 76' are dimensioned to provide sufficient slack between the controls 40 and the brakes 44, 44' to permit a conventional steering/turning radius for the front wheel 30.

Referring now to FIG. 4, the cable 56 is shown connected to a conventional side-pull caliper brake 44, (FIG. 4 applies interchangeably to front and rear brakes), although use with center-pull or other conventional brake configurations is contemplated. The connection is made with a conventional adjustable barrel 97 and an aperture 99 dimensioned to retain the enlarged end 54' of the cable 56. The brake 44 is provided with a spring (not shown) which biases the arms 96 in a normally open position. As the handle member 48 is rotated in the direction 98, the cable 56 is drawn within the sheath 76 to overcome the biasing force and close the arms 96, each shown provided with a brake shoe 100. The arms 96 move in a direction illustrated by an arrow 101 to engage a wheel rim 124 upon which a tire 126 is mounted, thus stopping the bicycle 10. Once the bicycle 10 has stopped or sufficiently slowed, the handle member 48 is released, permitting the brake 44, to resume its normal disengaged position maintained by the spring (not shown).

Referring now to FIGS. 10–12, a preferred embodiment of the brake control of the invention is depicted, being designated generally at 40'. In this embodiment, bending stress on the brake cable 56 is minimized by providing a system which pulls the cable linearly to actuate the brake 44 (best seen in FIG. 1).

To achieve this action, the control 40' includes a fixed cable fitting 130, preferably of solid, cylindrical construction with a first truncated end 132, a second angled end 134, and a throughbore 136. The truncated end 132 has a counterbore 140 which is coaxial with the throughbore 136 and is dimensioned to accommodate one end of the cable sheath 76 (best seen in FIG. 11). The fitting 130 corresponds generally in function to the barrel 78, and is dimensioned to be fixed within the handlebar 34 as shown in FIGS. 11 and 12, either by a friction fit, by welding or by suitable adhesive.

A movable handle member generally designated 48' includes a tubular body portion 142 and an insert 144. In similar fashion to the covering 60, the body portion 142 may be made of a resilient plastic material or may be rigid metal such as aluminum or steel covered with a foam covering. The body portion 142 is dimensioned to telescopically slide over one end of the handlebar 34 and to slide coaxially thereabout. An outer end 145 of the tubular body portion 142 is normally spaced from the end 42 of the handlebar 34. The insert 144 includes a lug portion 146 which is generally cylindrical and is configured to slide coaxially within the handlebar 34. The lug portion 146 has an angled end 148 and a second end 150. The second end 150 is integral with a radially extending annular flange portion 152 which has an inner surface 154 and an outer surface 156. The insert 144 has a throughbore 158 which is generally coaxial with the throughbore 136, and is preferably provided with an enlarged counterbore 160 in the surface 156. The outer periphery of the flange 152 is dimensioned to frictionally engage the interior of the body portion 142 near the end 162. An endcap 164 may be provided to protect the interior of the control 40' from exposure to the elements. The endcap 164 may be secured to the end 162 of the body portion 142 by friction, by adhesive, by set screws (not shown) or other suitable fastening means.

Once the fitting 130 is secured within the handlebar 34 and the insert 144 is secured within the tubular body portion 142, the cable 56 is fed through the throughbores 158 and 136 and eventually out of the handlebar 34, such as through the openings 114, 116 (best seen in FIG. 9). The cable 56 is pulled tight until the enlarged end 54 seats within the counterbore 160. The cable is then threaded through the cable sheath 76, which is then fed back up through the handlebar 34 until it abuts against the counterbore 140 in the fitting 130. The opposite end of the cable 54' is secured to one of the brakes 44 in the manner described previously and depicted in FIG. 4.

Referring now to FIG. 11, once assembled, the movable tubular body portion 142 and the insert 144 are held against the fitting 130, and the end of the handlebar 34 by the biasing force exerted by the brake 44. In the at rest position, with the brake released, the angled surfaces 134 and 148 are disposed in interfacing relation to each other.

Referring now to FIG. 12, once the rider wishes to engage the brakes, the handle member 48' is rotated axially about the handlebar 34. The greater the arc of rotation, the greater separation will be created between the fitting 130 and the insert 144 due to the reorientation of the angled surfaces 134 and 148, which causes axial displacement of the handle member 48' in the direction indicated generally by the arrow 166. Accordingly, the greater the amount of rotation, the greater will be the pulling force exerted on the brake 44 through the extension of the cable 56. The greatest axial displacement will occur upon a rotation of 180° from the at rest position, however, depending upon the adjustment of the brakes 44, less than 180° of rotation of the handle member 48' may be necessary to exert full braking force. Regardless of the amount of rotational force exerted on the handle member 48', the angled surfaces 134 and 148 will always be in contact to some extent. Once the pressure on the handle member 48' is released, the control 4? ' will resume the at rest position depicted in FIG. 11 due to the spring action of the brakes 44 and the brakes will be released.

Consequently, the present invention provides a bicycle brake control to be mounted on the end of a handlebar for ease of access and which permits wrist action braking, requiring less effort than conventional lever handled brake controls. The invention also is provided with a simple design which permits the cable connection, as well as portions of the cable itself, to be concealed within the handlebar for corrosion protection and a more aesthetically pleasing appearance.

While a preferred embodiment of the invention has been shown, it will be understood that the invention may be otherwise embodied within the scope of the appended claims Minor variations in the structure and in the arrangement and size of the various parts may occur to those skilled in the art without departing from the spirit and scope of the invention.

I claim:

1. A handlebar-mounted cable control for a bicycle brake cable or the like, comprising:
   a cable fitting having a throughbore, a first end and a second angled end, said fitting being fixed within an open end of a handlebar so that said angled end faces the open handlebar end;
   a handle member including a tubular body portion configured to telescopically slide over the open end of the handlebar and to coaxially rotate thereabout, said body portion having an outer end spaced from the open handlebar end;
   an insert portion fixed within said body portion of said handle member and having a lug portion projecting into the interior of the handlebar, the lug portion having a throughbore and a first angled end being generally complementary with and configured to slidingly contact said angled end of said fitting;
   said throughbores being generally coaxial, said insert portion having means for locking an end of the cable thereto;
   where in coaxial rotation of said tubular body portion and said insert portion relative to said cable fitting in the handlebar causes axial displacement of said handle member from the end of the handle bar and exerts an axial pulling action on the cable as said angled end on said insert is rotatably reoriented relative to said angled end on said cable fitting.

2. The cable control as defined in claim 1 wherein said lug portion has a second end with a counterbore for receiving and securing an enlarged end of the cable.

3. The cable control as defined in claim 1 wherein said first end of said cable fitting is provided with a counterbore configured for receiving an end of a cable sheath.

4. The cable control as defined in claim 1 further comprising an endcap releasably fixed to said outer end of said tubular body portion and covering said insert.

5. The cable control as defined in claim 1 wherein said tubular body portion is fabricated of resilient material.

6. The cable control as defined in claim 1 wherein said insert further includes a radially extending annular flange configured to functionally engage the interior of the tubular body portion.

7. A combination handlebar and cable control for a sheathed bicycle brake cable or the like, comprising:
   a tubular handlebar having two ends, at least one of said ends having a fixed angled formation associated therewith;
   a handle member including a tubular body portion configured to telescopically slide over said end having said angled formation and being coaxially rotatable about said end, said handle member having a lug portion with an angled end being generally complementary with said angled formation of said handlebar end;
   means for accommodating passage of the cable through said handlebar and said handle member and for fixing an end of the cable to said handle member;
   wherein rotation of said handle member relative to said handlebar end causes rotation of said angled end relative to said angled formation so as to axially displace said handle member from said handlebar end and exert an axial pulling force on the cable.

8. A combination handlebar cable and cable control, comprising:
   a tubular handlebar having two ends, at least one of said ends having a fixed angled formation associated therewith;
   a handle member including a tubular body portion configured to telescopically slide over said end having said angled formation and being coaxially rotatable about said end, said handle member having a lug portion with an angled end being generally complementary with said angled formation of said handlebar end;
   a sheated bicycle brake cable;
   means for accommodating passage of an end of said cable through said handlebar and said handle member and for fixing said end of said cable to said handle member;

wherein rotation of said handle member relative to said handlebar end causes rotation of said angled end relative to said angled formation so as to axially displace said handle member from said handlebar end and exert an axial pulling force on said cable.

9. The combination as defined in claim 8 wherein said handle member is secured in operational relation to said handlebar only by said cable.

* * * * *

UNITED STATES PATENT AND TRADEMARK OFFICE
CERTIFICATE OF CORRECTION

PATENT NO. : 4,966,047
DATED : October 30, 1990
INVENTOR(S) : Alwin Krauer and Richard P. Frueh It is certified that error appears in the above-identified patent and that said Letters Patent is hereby corrected as shown below:

On the title page INID Code No. [62], delete "Division" and insert --Continuation-in-part--;

Column 2, line 61, after "outline" insert --within--;

Column 2, line 65, after "handlebar" insert --through--;

Column 3, line 4, after "the" insert --direction--;

Column 3, line 6, after "the" insert --direction--;

Column 3, line 17, after "of" insert --a preferred--;

Column 7, line 32, delete "4?" and insert --40'--; and

Column 8, line 64, delete "sheated" and insert --sheathed--.

Signed and Sealed this

Twenty-fifth Day of August, 1992

Attest:

DOUGLAS B. COMER

Attesting Officer

Acting Commissioner of Patents and Trademarks